(12) United States Patent
Mabrouki

(10) Patent No.: US 9,750,366 B2
(45) Date of Patent: Sep. 5, 2017

(54) CONTAINER FOR A BEVERAGE-PREPARATION DEVICE HAVING A FLEXIBLE CONVEYING ELEMENT

(71) Applicant: BRAVILOR HOLDING B.V., Heerhugowaard (NL)

(72) Inventor: Yann Mabrouki, Nanterre (FR)

(73) Assignee: BRAVILOR HOLDING B.V., Heerhugowaard (NL)

( * ) Notice: Subject to any disclaimer, the term of this patent is extended or adjusted under 35 U.S.C. 154(b) by 17 days.

(21) Appl. No.: 14/768,292

(22) PCT Filed: Feb. 10, 2014

(86) PCT No.: PCT/NL2014/050079
§ 371 (c)(1),
(2) Date: Aug. 17, 2015

(87) PCT Pub. No.: WO2014/126460
PCT Pub. Date: Aug. 21, 2014

(65) Prior Publication Data
US 2015/0359376 A1     Dec. 17, 2015

(30) Foreign Application Priority Data

Feb. 18, 2013 (NL) ...................................... 2010318

(51) Int. Cl.
*A47J 31/40* (2006.01)
*A47J 31/44* (2006.01)
(Continued)

(52) U.S. Cl.
CPC ......... *A47J 31/404* (2013.01); *A47J 31/4403* (2013.01); *B65G 37/00* (2013.01); *B65G 45/14* (2013.01); *B65G 65/46* (2013.01)

(58) Field of Classification Search
CPC ..... A47J 31/404; A47J 31/4403; B65G 37/00; B65G 65/46; B65G 45/14
(Continued)

(56) References Cited

U.S. PATENT DOCUMENTS 1,812,911 A * 7/1931 Walter ................... B65D 88/68
110/108
1,960,778 A * 5/1934 Goss ...................... B65D 88/68
110/286
(Continued)

FOREIGN PATENT DOCUMENTS

EP    0 654 430 A2    5/1995
EP    2 335 531 A1    6/2011
(Continued)

OTHER PUBLICATIONS

International Search Report, dated Mar. 20, 2014, from corresponding PCT application.

*Primary Examiner* — Donnell Long
(74) *Attorney, Agent, or Firm* — Young & Thompson

(57) ABSTRACT

A container for a beverage-preparation device includes a storage chamber for pulverulent material, a discharge opening in a chamber wall, a conveying element which extends in a direction of transport, adjoins the opening, is rotatable about a longitudinal axis and is situated in the chamber, and a dispensing duct which adjoins the opening, is situated at least partly outside the chamber, has a predetermined diameter and a longitudinal direction which runs at an angle with respect to the transport direction, the conveying element extending at least substantially as far as the dispensing duct. A flexible elongate scraping member is rotatably connected to the conveying element by its first end and extends in the longitudinal direction from the conveying element into the dispensing duct. The scraping member, which may be con- (Continued)

figured to be helical, prevents pulverulent material from sticking against the inner wall, while ensuring good conveying and metering action.

16 Claims, 6 Drawing Sheets

(51) Int. Cl.
  *B65G 37/00* (2006.01)
  *B65G 45/14* (2006.01)
  *B65G 65/46* (2006.01)

(58) Field of Classification Search
  USPC .......................... 222/412, 413, 236
  See application file for complete search history.

(56) References Cited

U.S. PATENT DOCUMENTS

| | | | | |
|---|---|---|---|---|
| 3,381,801 A | * | 5/1968 | Rastoin | B65G 33/00 198/659 |
| 3,707,224 A | * | 12/1972 | Rastoin | B65G 33/00 198/659 |
| 3,802,551 A | | 4/1974 | Somers | |
| 4,665,808 A | * | 5/1987 | Pulvermuller | A47J 31/40 222/66 |
| 5,054,658 A | * | 10/1991 | Aronie | E04F 21/10 198/671 |
| 5,287,993 A | * | 2/1994 | Ford | A47J 31/404 222/135 |
| 5,918,768 A | * | 7/1999 | Ford | A47J 31/401 222/113 |
| 2004/0173637 A1 | * | 9/2004 | Whippie | G01F 13/005 222/236 |
| 2010/0199850 A1 | | 8/2010 | Koopman et al. | |

FOREIGN PATENT DOCUMENTS

| | | |
|---|---|---|
| GB | 1 129 960 A | 4/1966 |
| NL | 2000662 C2 | 11/2008 |
| WO | 2008143505 A1 | 11/2008 |
| WO | 2012/142390 A2 | 10/2012 |

* cited by examiner

CONTAINER FOR A BEVERAGE-PREPARATION DEVICE HAVING A FLEXIBLE CONVEYING ELEMENT

FIELD OF THE INVENTION

The invention relates to a container for a beverage-preparation device comprising a storage chamber for pulverulent material, a discharge opening in a wall of the chamber, a conveying element which extends in a direction of transport, adjoins the opening, is rotatable about a longitudinal axis and is situated in the chamber, and a dispensing duct which adjoins the opening, is situated at least partly outside the chamber, has a predetermined diameter and a longitudinal direction which runs at an angle with respect to the direction of transport, the conveying element extending at least substantially as far as the dispensing duct.

The invention also relates to a beverage-preparation device provided with such a container.

BACKGROUND OF THE INVENTION

NL 2 000 662, which is in the name of the Applicant, discloses an ingredient container which contains a pulverulent substance for the preparation of an instant beverage. The bottom of the ingredient container comprises a screw conveyor by means of which pulverulent ingredients, such as for example coffee powder, milk powder, powder for an instant soft drink, tea or soup, are metered and are conveyed to a discharge duct via an opening in the wall. Via the discharge duct, the powder is introduced into a mixing unit on account of the force of gravity where the ingredient is combined with hot or cold water so as to dissolve the ingredient and produce an instant beverage.

The screw conveyor in the known beverage-dispensing machine is mounted in a fitted manner in a trough in the bottom of the ingredient container. The screw conveyor protrudes through the opening in the side wall into the discharge structure and moves the pulverulent ingredient from the container through the opening in the side wall by means of rotation about the longitudinal axis. The pulverulent ingredients which are used in the known beverage-dispensing machine are generally hygroscopic, as a result of which said ingredients form a sticky substance when they come into contact with water vapour which condensates in the dispensing duct. This may cause the dispensing duct to become blocked and thus disrupt operation thereof.

It is an object of the invention to provide a container for a beverage-preparation device which provides accurate and reliable metering and conveying of pulverulent ingredients. It is a further object of the invention to provide such a container in which, when the pulverulent ingredients are dispensed to a mixing device via a feed duct in a moist environment, the ingredients are prevented from adhering to the inner wall of the dispensing duct when they come into contact with liquid. It is a further object of the invention to provide a container which consists of a small number of components and is of a relatively simple construction.

SUMMARY OF THE INVENTION

To this end, the beverage-preparation device according to the invention is characterized by the fact that a flexible elongate scraping element is rotatably connected to the conveying element by its first end and extends in the longitudinal direction from the conveying element against or near the wall of the dispensing duct into the dispensing duct.

By rotating the first end of the flexible scraping element, the latter is rotated against or at a short distance from the inner wall of the dispensing duct. As a result thereof, encrusted ingredients are scraped off and blockage of the dispensing duct is prevented.

Due to its flexibility, the scraping element is able to follow the curvature of the dispensing duct when it is rotatably driven by the conveying element which is, for example, formed by a screw conveyor. In this way, it is possible to provide dispensing ducts of a large number of different orientations and geometries with a scraping element in a relatively simple manner. As used herein, the term "flexible" is understood to mean scraping elements which are sufficiently flexible to follow a curved path of the dispensing duct, but which, upon rotation of the first end, pass on said rotation along the entire length of the scraping element as far as the free end thereof.

By using the flexible and bendable scraping element according to the invention, it is also possible to make the dispensing duct flexible and/or bendable or rotatable. In addition, by using the flexible elongate scraping element, it is possible to provide existing containers of beverage-preparation devices with a scraping element by fitting the latter in the dispensing duct and connecting it to the conveying element in the container, the so-called "retrofitting".

Furthermore, by using the drive unit of the conveying element for rotation of the scraping element, a separate motor can be omitted, so that the scraping element according to the invention is relatively simple, comprises few components and is thus a relatively inexpensive solution.

It should be noted that a flexible tubular conveyor, provided with a helical conveying element with a helical drive, is known from U.S. Pat. No. 3,802,551. The helical drive is rotated by a separate motor which is connected to an end of a helical turn of the conveying element. The helical turn bears against the inner wall of the conveyor pipe.

Furthermore, the prior art discloses a flexible conveyor pipe for conveying pulverulent substances which comprises a rotatable flexible screw conveyor which is situated at a distance from the pipe wall. The flexible screw conveyor is driven via a separate motor.

The scraping element according to the invention may extend through the entire dispensing duct or through a part thereof, and may in this case bear against the inner wall or may be placed at a relatively small distance therefrom. The scraping element may be made from plastic or metal, for example one or more metal wires or strands which run parallel to the longitudinal direction of the dispensing duct, for example from stainless steel. It is also possible to make the scraping element from a flexible plastic, for example from a flexible core with a star-shaped or cruciform scraping element. In all the embodiments mentioned above, the flexibility of the scraping element is such that the scraping element can follow the bends in the dispensing duct.

In an embodiment of a container according to the invention, the dispensing duct is arranged so as to be pivotable about an axis running in the direction of transport. The flexible scraping element can follow the various orientations of the dispensing duct if the end of the scraping element is attached to the screw conveyor by means of a simple and fixed connection.

In a preferred embodiment, the scraping element is configured to be helical and comprises parts which move along the wall in the direction of transport upon rotation of the scraping element in the longitudinal direction of the dispensing duct. As a result of the helical scraping element, the rotation of the conveying element is efficiently transformed into a movement directed along the wall of the dispensing duct, so that both a scraping effect and a conveying effect are achieved, while the pulverulent material can be conveyed through the hollow central part of the scraping element on account of the force of gravity.

In the container according to the invention, the conveying element comprises, for example, a substantially stiff Archimedean screw. The conveying element and the scraping element may have substantially equal diameters, so that both diameters are optimally adapted to the dimensions of the conveying duct. By configuring the scraping element to have a diameter which is essentially equal to that of the screw conveyor, the former is situated sufficiently close to the wall of the conveying duct at important positions, such as in the relatively sharp outer and inner bends of the conveying duct, as well as in the position where the scraping element is connected to the conveying element, to prevent pulverulent material from sticking, so that blockage is avoided.

In an embodiment, the scraping element is configured to be hollow, thus enabling free transportation of pulverulent material through the centre of the scraping element, for example via the propulsive force of the conveying element and/or on account of the force of gravity. The scraping element may surround a duct having a diameter which is between 0.5 and 0.95 times the internal diameter of the dispensing duct. This ensures that the pulverulent material can freely be conveyed through the centre of the dispensing duct.

An embodiment of a container according to the invention comprises a circular agitating part which is fitted in the chamber so as to be rotatable about a shaft at right angles to the direction of transport, and which engages with the conveying element by a peripheral toothing. By driving both the agitating part and the scraping element by means of a single motor, a compact and relatively simple metering and conveying facility is provided in the container.

BRIEF DESCRIPTION OF THE DRAWINGS

An embodiment of a container and a beverage-dispensing device according to the invention will be explained in greater detail with reference to the attached drawing, in which.

DETAILED DESCRIPTION OF AN EMBODIMENT OF THE INVENTION

Figure 1:
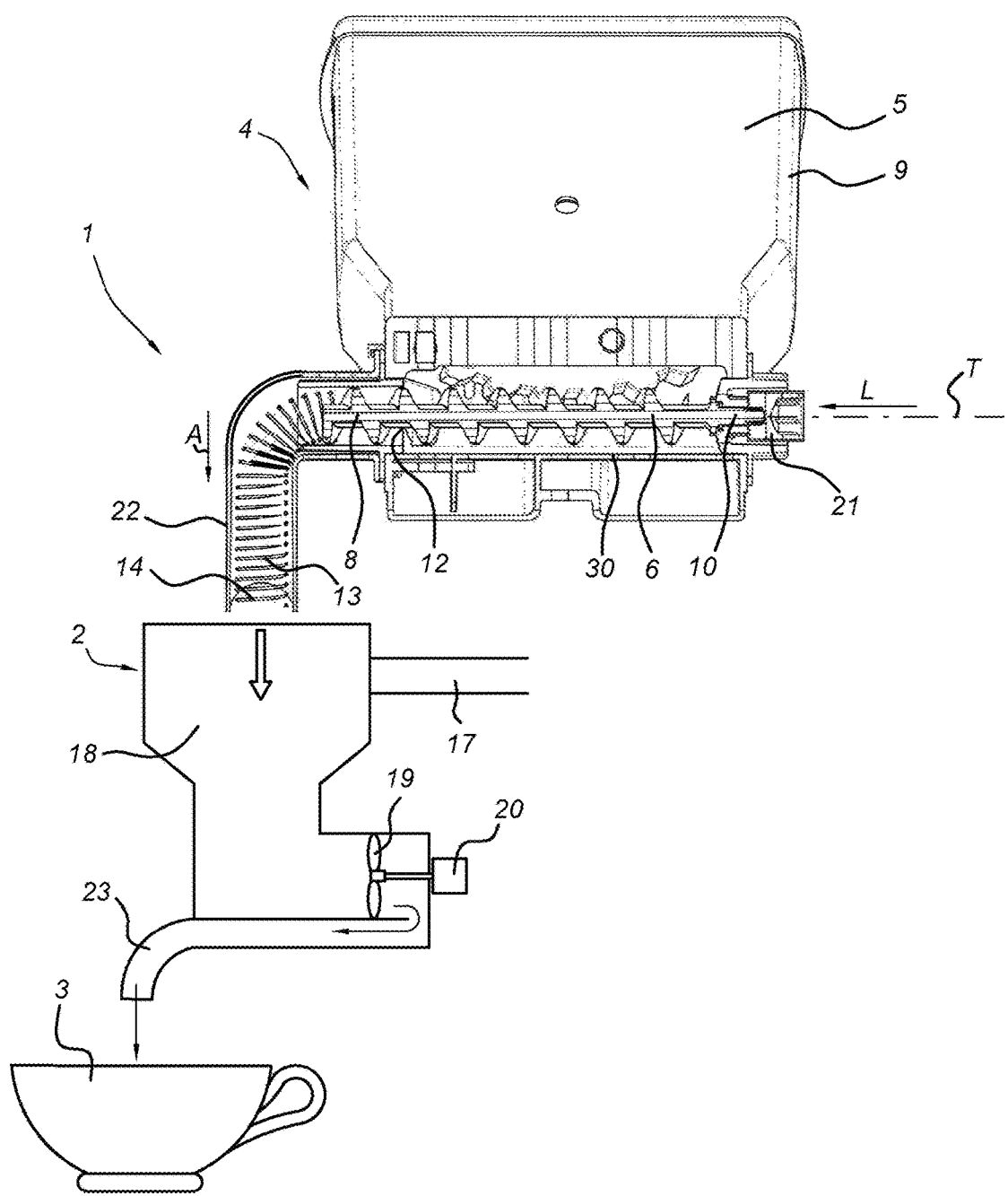
FIG. 1 shows a side view of a beverage-dispensing device provided with a dispensing duct with a scraping device according to the invention.

FIG. 1 shows a beverage-preparation device 1 according to the invention, comprising a container 4, a mixing unit 2 and a water supply 17. The diagrammatically illustrated mixing unit 2 has a mixing chamber 18 with a funnel-shaped inlet to a rotor 19 which is driven by a motor 20. Water is supplied to the mixing chamber 18 via a pipe of the water supply 17 and pulverulent ingredients are supplied to the mixing chamber via a dispensing duct 22 of the container 4 in the longitudinal direction A of the dispensing duct 22. Under the action of the rotor 19, the water is mixed with the ingredients which dissolve in the water, thus producing a beverage. As is indicated by an arrow in the figure, the ingredients which are dissolved in water or mixed with the water are discharged via an outlet or dispensing duct 23 to a container, such as a beaker or cup 3. The user can then drink the beverage which has been produced from the cup 3.

The container 4 comprises a chamber 5 with a wall 9. A screw conveyor 6, which is known per se, extends in a direction of transport L along the bottom 30 of the container 4 and protrudes into the wall 9 through a hole 12. One end 8 of the screw conveyor 6 protrudes into a horizontal part of the dispensing duct 22, and the end 8 is fixedly connected to a helical scraping member 13. The free end 14 of the scraping member 13 is situated near the end of the dispensing duct 22. The end 10 of the screw conveyor 6 is connected to a drive 21, for example an electric motor, in order to rotatably drive the screw conveyor about its longitudinal axis T. When the screw conveyor 6 rotates about its longitudinal axis T, the pulverulent ingredients which are situated in the chamber 5 are conveyed in the direction of the dispensing duct 22. In the dispensing duct, the pulverulent ingredients fall through the central part of the dispensing duct into the mixing unit 2 on account of the force of gravity and are moved along by the helical scraping element in the longitudinal direction A of the conveying duct 22 near the walls of the dispensing duct. In the illustrated side view, the longitudinal direction A of the dispensing duct 22 is at right angles to the longitudinal axis T, but embodiments are possible in which the angle between the dispensing duct 22 and the longitudinal axis T is smaller than 90°.

Figure 2:
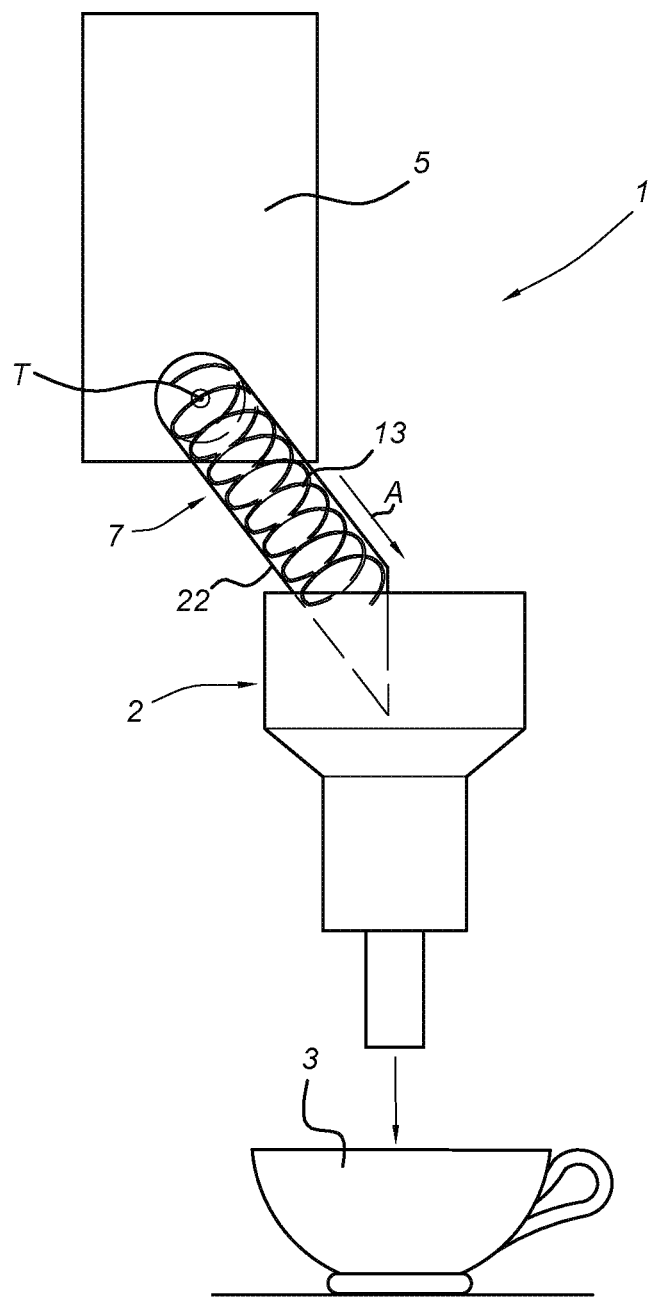
FIG. 2 shows a front view of the device according to FIG. 1.

As is illustrated in FIG. 2, the dispensing duct 22 may be attached to the container 4, together with the scraping member 13, so as to be pivotable about the longitudinal axis T.

Figure 3:
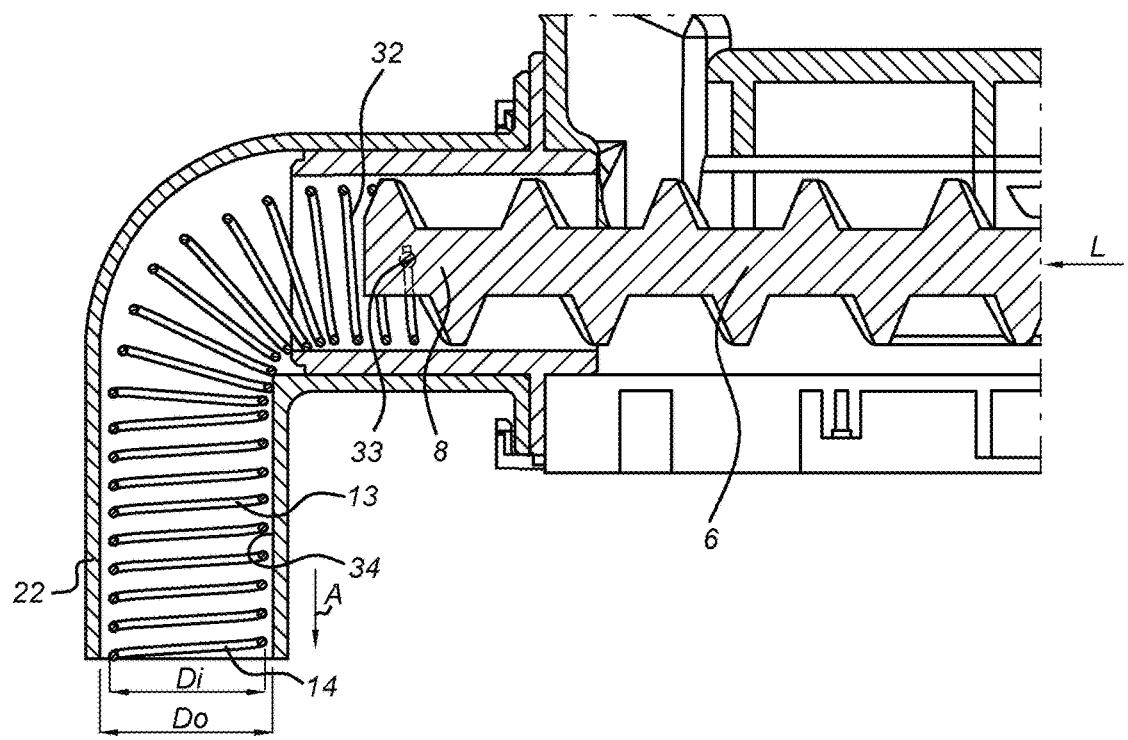
FIG. 3 shows an enlarged sectional view through the dispensing duct of the device according to FIG. 1.
Figure 4:
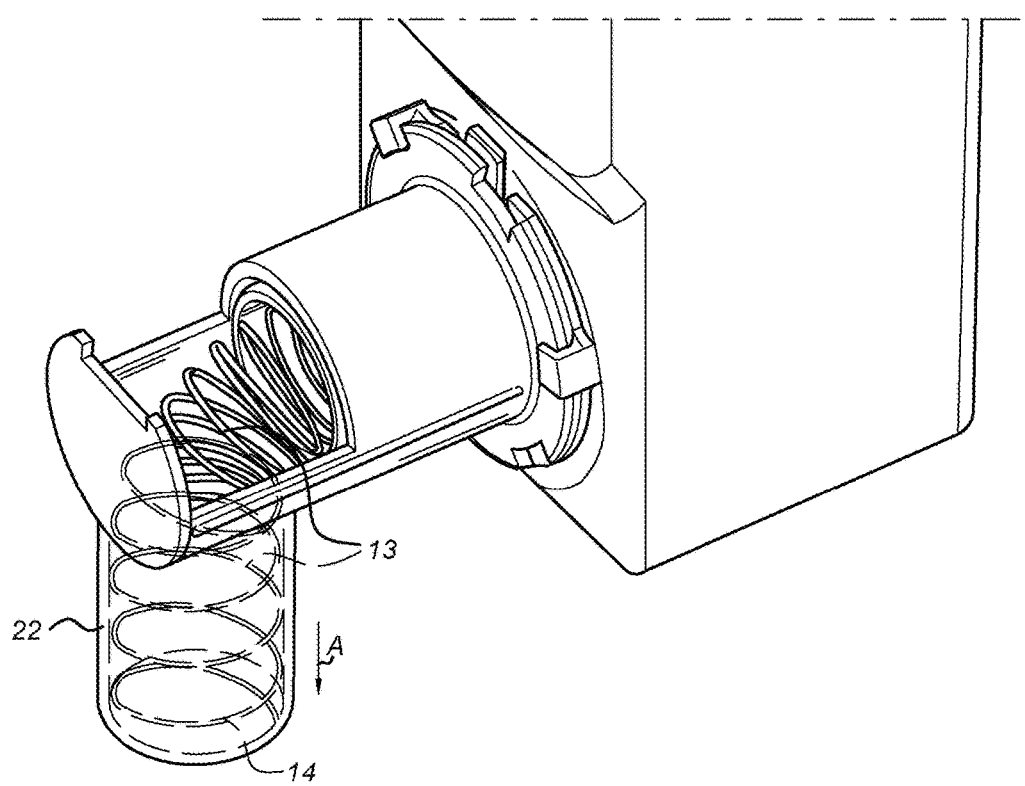
FIG. 4 shows a perspective view of the dispensing duct according to FIG. 3.

As is illustrated in FIG. 3 and FIG. 4, the first end 32 of the scraping element 13 is connected to the end 8 of the screw conveyor 6 via a fastening element 33. The scraping element 13 is a wire-like element which bears against an inner wall 34 of the dispensing duct 22. The free end 14 of the scraping element 13 is situated near the end of the dispensing duct 22. The internal diameter DO of the dispensing duct 22 is, for example, 2 cm, while the internal diameter of the duct formed within the wire-like scraping element 13 is, for example 1.5 cm, so that the pulverulent material can move freely through the central part of the dispensing duct.

Figure 5:
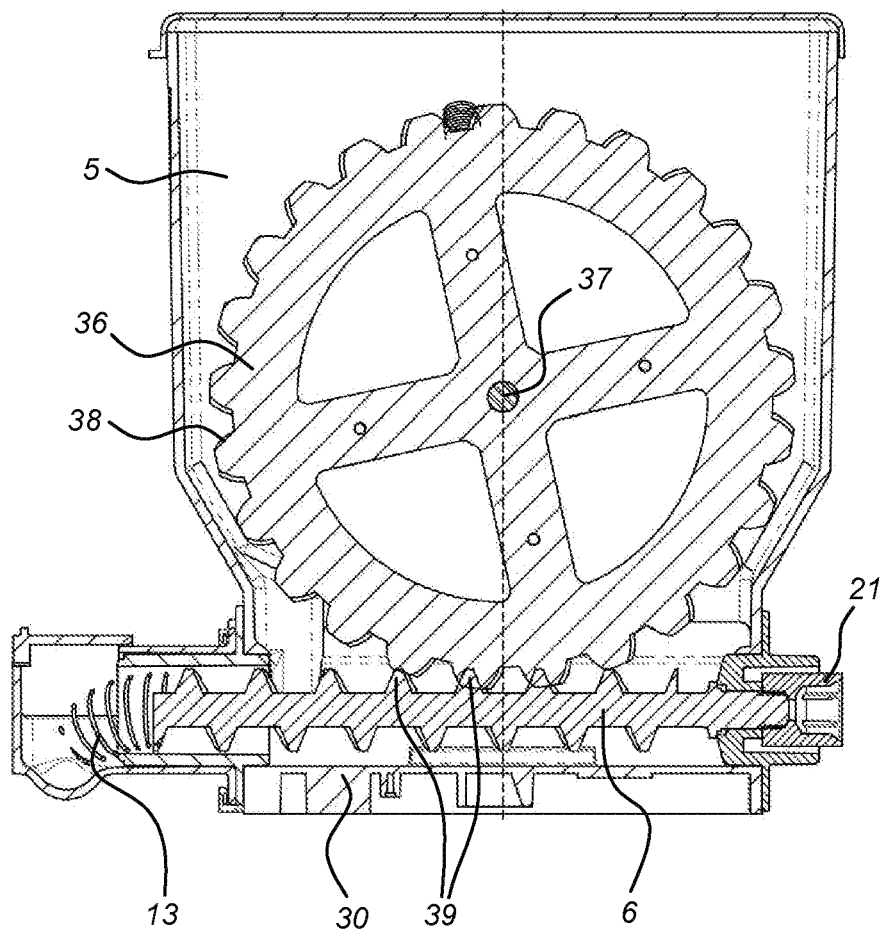
FIG. 5 shows a sectional view through a container according to the invention comprising an agitating device in the storage chamber, and FIG. 6 and FIG. 7 diagrammatically show a cross section of alternative embodiments of a scraping element according to the invention.

FIG. 5 shows how a wheel-shaped agitating part 36 is accommodated in the chamber and is rotatably placed on a shaft 37 which runs at right angles to the plane of the drawing. The toothing 38 on the periphery of the wheel 36 engages with the vanes 39 of the screw conveyor 6, so that the agitating part and the scraping element are driven by the same motor 21.

Figure 6:
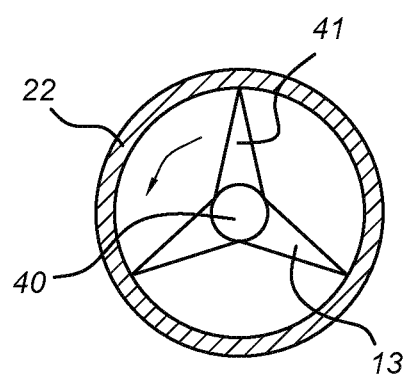

FIG. 6 diagrammatically shows a cross section through the dispensing duct 22 containing a scraping element 13 having a star-shaped cross section. The scraping element 13 has a flexible elongate core 40, made from, for example, plastic with three flexible pointed contact members 41 which are attached thereto and run in a radial direction. The scraping element 13 may be made in one piece, for example by means of injection-moulding.

Figure 7:
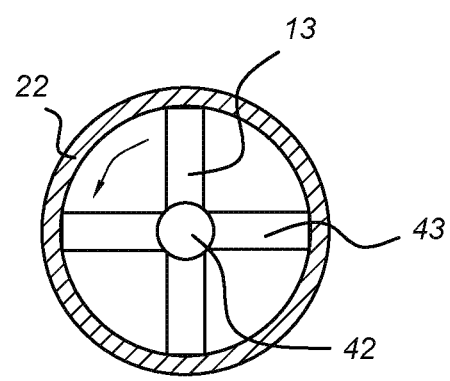

FIG. 7 diagrammatically shows a cross section through a scraping element 13 having a cruciform cross section, in which flexible contact members 13 are attached to a flexible central core 42 in a cruciform manner.

The invention claimed is:

1. A container for a beverage-preparation device comprising:
   a storage chamber for pulverulent material;
   a discharge opening in a wall of the chamber;
   a conveying element which extends in a direction of transport, adjoins the opening, is rotatable about a longitudinal axis and is situated in the chamber;
   a dispensing duct which adjoins the opening and has a bend relative to the longitudinal axis, is situated at least partly outside the chamber, has a predetermined diameter, and, in a direction downstream of the bend, has a longitudinal direction which runs at an angle with respect to the direction of transport, the conveying element extending at least substantially as far as the dispensing duct; and
   a flexible elongate scraping element that is rotatably connected to the conveying element by a first end of the scraping element and extends in the longitudinal direction from the conveying element against or near a wall of the dispensing duct into the dispensing duct, a portion of the scraping element being disposed in the bend.

2. The container according to claim 1, wherein the dispensing duct is pivotable relative to the chamber about an axis running in the direction of transport.

3. The container according to claim 2, wherein the scraping element is configured to be helical and comprises parts which are movable in the longitudinal direction.

4. The container according to claim 2, wherein the scraping element comprises a wire-like scraping body which bears against an inner wall of the dispensing duct.

5. The container according to claim 2, wherein the conveying element comprises a substantially stiff Archimedean screw.

6. The container according to claim 2, wherein the scraping element is configured to be hollow.

7. The container according to claim 1, wherein the scraping element is configured to be helical and comprises parts which are movable in the longitudinal direction.

8. The container according to claim 7, wherein the conveying element comprises a substantially stiff Archimedean screw.

9. The container according to claim 1, wherein the scraping element comprises a wire-like scraping body which bears against an inner wall of the dispensing duct.

10. The container according to claim 9, wherein the conveying element comprises a substantially stiff Archimedean screw.

11. The container according to claim 1, wherein the conveying element comprises a substantially stiff Archimedean screw.

12. The container according to claim 11, wherein the conveying element and the scraping element have substantially equal diameters.

13. The container according to claim 11, further comprising a circular agitating part which is fitted in the chamber to be rotatable about a shaft at right angles to the direction of transport, and which engages with the conveying element by a peripheral toothing.

14. The container according to claim 1, wherein the scraping element is configured to be hollow.

15. The container according to claim 14, wherein the scraping element surrounds a duct having a diameter which is between 0.5 and 0.9 times the internal diameter of the dispensing duct.

16. A beverage-preparation device provided with the container according to claim 1.

* * * * *